United States Patent
Kellogg et al.

[11] Patent Number: 6,158,171
[45] Date of Patent: Dec. 12, 2000

[54] SWING DOOR SEAL AND RETAINER ASSEMBLY HAVING A SEAL WITH INTERIOR WEBS

[75] Inventors: Charles Frederick Kellogg; Alfred T. Dietrich, both of Marion, Ohio

[73] Assignee: Overhead Door Corporation, Dallas, Tex.

[21] Appl. No.: 09/085,921

[22] Filed: May 28, 1998

[51] Int. Cl.[7] .............................. E06B 7/16; E06B 7/22
[52] U.S. Cl. ................... 49/489.1; 49/498.1; 49/475.1
[58] Field of Search ...................... 49/489.1, 498.1, 49/490.1, 475.1, 366, 367, 368, 369

[56] References Cited

U.S. PATENT DOCUMENTS

| | | | |
|---|---|---|---|
| 1,904,491 | 4/1933 | Manhan | 49/490.1 |
| 2,263,806 | 11/1941 | Hammerl | 49/498.1 |
| 2,428,731 | 10/1947 | Abrams | 49/490.1 |
| 2,908,949 | 10/1959 | Frehse | 49/496.1 |
| 2,968,845 | 1/1961 | Dickinson | 49/496.1 |
| 3,308,727 | 3/1967 | Hurt | 49/479.1 |
| 3,378,956 | 4/1968 | Parks et al. | 49/478.1 |
| 3,518,792 | 7/1970 | Williamson et al. | |
| 3,564,771 | 2/1971 | Reynolds | 49/383 |
| 3,883,993 | 5/1975 | Pullan | 49/490.1 |
| 3,886,686 | 6/1975 | Urbanick | |
| 3,899,260 | 8/1975 | Kerschner | 404/64 |
| 3,952,455 | 4/1976 | McAlarney | 49/496.1 |
| 4,052,819 | 10/1977 | Beischel et al. | 49/368 |
| 4,119,325 | 10/1978 | Oakley et al. | 277/642 |
| 4,214,036 | 7/1980 | Bright | |
| 4,232,081 | 11/1980 | Pullan | |
| 4,448,430 | 5/1984 | Bright | |
| 4,527,807 | 7/1985 | Urbanick | |
| 4,769,950 | 9/1988 | Ogawa et al. | |
| 4,807,397 | 2/1989 | Doan | |
| 4,974,366 | 12/1990 | Tizzoni | |
| 5,072,546 | 12/1991 | Ogawa | |
| 5,117,587 | 6/1992 | Doan | |
| 5,244,704 | 9/1993 | Arima | 428/369 |
| 5,383,701 | 1/1995 | Okada | |
| 5,499,475 | 3/1996 | Court et al. | 49/495.1 |
| 5,551,192 | 9/1996 | Avendano et al. | 49/484.1 |
| 5,806,914 | 9/1998 | Okada | 296/146.9 |
| 5,964,499 | 10/1999 | Carter | 296/181 |

FOREIGN PATENT DOCUMENTS

| | | | |
|---|---|---|---|
| 331981 | 7/1930 | United Kingdom | 49/489.1 |
| 3812/76 | 5/1978 | United Kingdom | |
| 2058892 | 4/1981 | United Kingdom | |
| 2136038 | 3/1991 | United Kingdom | 49/498.1 |
| 2235716 | 3/1991 | United Kingdom | 49/490.1 |

*Primary Examiner*—Daniel P. Stodola
*Assistant Examiner*—Gregory J. Strimbu
*Attorney, Agent, or Firm*—Akin, Gump, Strauss, Hauer & Feld, L.L.P.

[57] ABSTRACT

Resilient seal and retainer assemblies for the side edges of a swing door panel of a cargo container. Each assembly includes, in one embodiment, a resilient seal member and a relatively rigid retainer member, coextruded of polyvinyl chloride. The retainer member includes a channel part with a web and opposed flanges for receiving one of the side edges of the door panel and the retainer member also includes a base part extending from the web for supporting the resilient seal member which includes a convex, thinned-walled rim part and internal webs extending radially inwardly from the rim part to reinforce the rim part and to restore the rim part to a convex, undeflected condition when the rim part is disengaged from a sealing surface on a frame of the door panel. In an alternate embodiment, the seal member of each of the assemblies is provided with its own integral coextruded base part which may be slidably or snap-fitted into engagement with a separately formed retainer member.

19 Claims, 3 Drawing Sheets

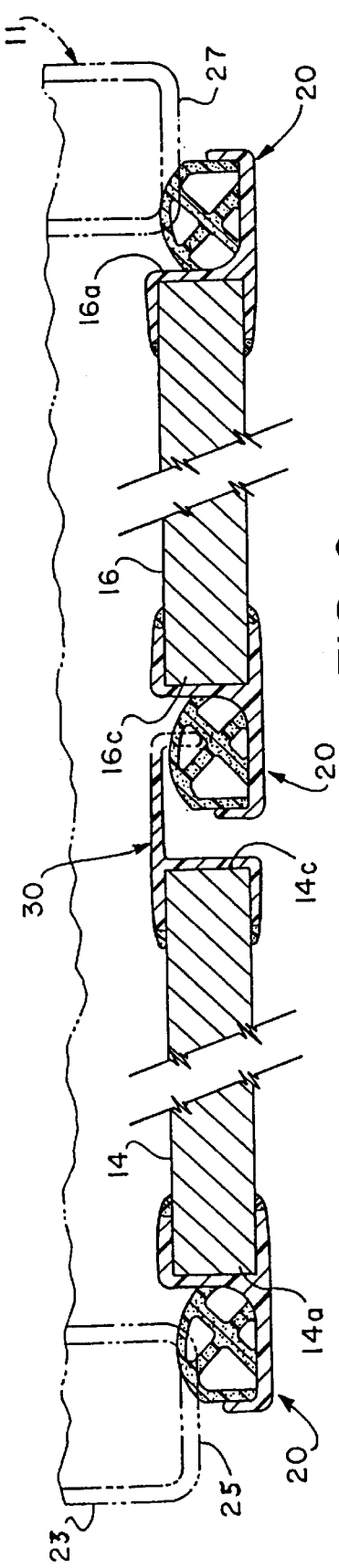
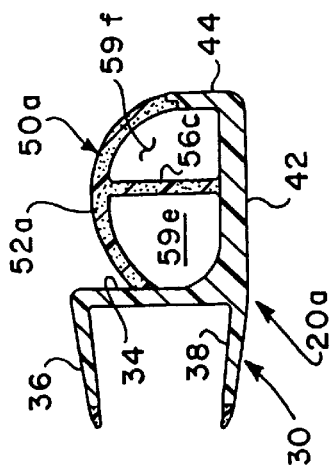
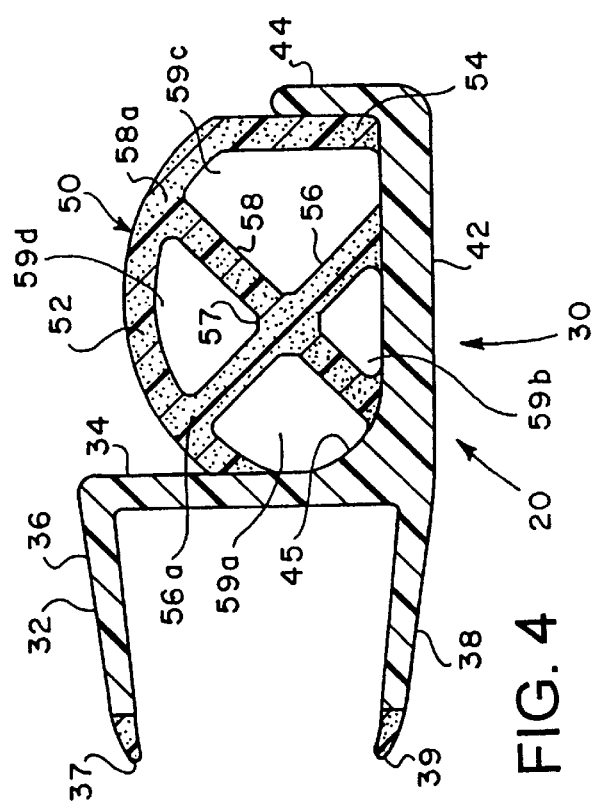

SWING DOOR SEAL AND RETAINER ASSEMBLY HAVING A SEAL WITH INTERIOR WEBS

FIELD OF THE INVENTION

The present invention pertains to door edge seal and retainer assemblies for heavy-duty swing doors, particularly doors used on motor truck cargo containers and the like.

BACKGROUND

There are many applications of swing doors, particularly in cargo container doors, wherein it is desirable to obtain a weather-tight or even low pressure hermetic seal about the perimeter of the door panel while at the same time providing minimal resistance to closure and opening forces exerted on the door. Still further, in the manufacture of doors and seal assemblies therefor, it is desirable to provide seal assemblies which may be easily attached to the door panel edges, require minimal attachment effort while also providing a seal between the panel edges and the seal assembly and also provide a seal member which engages the door frame in such a way that an effective seal is always provided throughout the life of the door. In this regard, long-lived seal resiliency is desired and retention of the seal member engaged with its retainer is also desired even as a consequence of repeated engagement and disengagement of the seal with the door frame or an adjacent door panel edge under a wide range of environmental conditions. It is to these ends that the present invention has been developed.

SUMMARY OF THE INVENTION

The present invention provides an improved door edge seal and retainer assembly, particularly adapted for swing doors for motor truck cargo containers and the like.

In accordance with one aspect of the present invention, a door panel edge seal assembly is provided wherein a retainer member adapted for engagement with the panel edge and a seal member are integrally joined and are preferably coextruded from a polymer material. In accordance with the invention the hardness or rigidity of the seal member and the retainer member are different so that the seal member retains resiliency and deformability to provide an effective seal and the retainer member provides sufficient rigidity to prevent unwanted deflection of the seal and to provide a suitable life for the seal and retainer assembly.

In accordance with another aspect of the invention, a seal member is provided which has a unique cross-section for maintaining resiliency over a long service life while resisting permanent deformation or creep of the seal member.

In accordance with another aspect of the invention, a door edge seal and retainer assembly is provided with a seal member which is fabricated separate from the retainer member, is easily assembled to the retainer member and tightly secured to the retainer member under all operating conditions, but which may be removed from the retainer member for replacement, if needed. The seal member is preferably formed with a resilient seal portion and a base portion which are of different degrees of rigidity or resiliency and the seal portion and base portion are integrally joined, preferably by coextrusion. The base portion is configured for snap-in assembly to the retainer member and the cooperating portions of the retainer member and the base portion of the seal member provide a tight and rigid connection therebetween.

Those skilled in the art will further appreciate the above-mentioned advantages and features of the invention together with other superior aspects thereof upon reading the detailed description which follows in conjunction with the drawings.

BRIEF DESCRIPTION OF THE DRAWING

FIG. 3 is a section view taken along the line 3—3 of FIG. 1 further illustrating the embodiment shown in FIG. 2;

FIG. 4 is a transverse detail section view of the seal and retainer assembly embodiment illustrated in FIGS. 2 and 3 on a larger scale;

FIG. 4a is a detail section view of one alternate embodiment of a seal and retainer assembly;

DETAILED DESCRIPTION OF THE PREFERRED EMBODIMENTS

Figure 1:
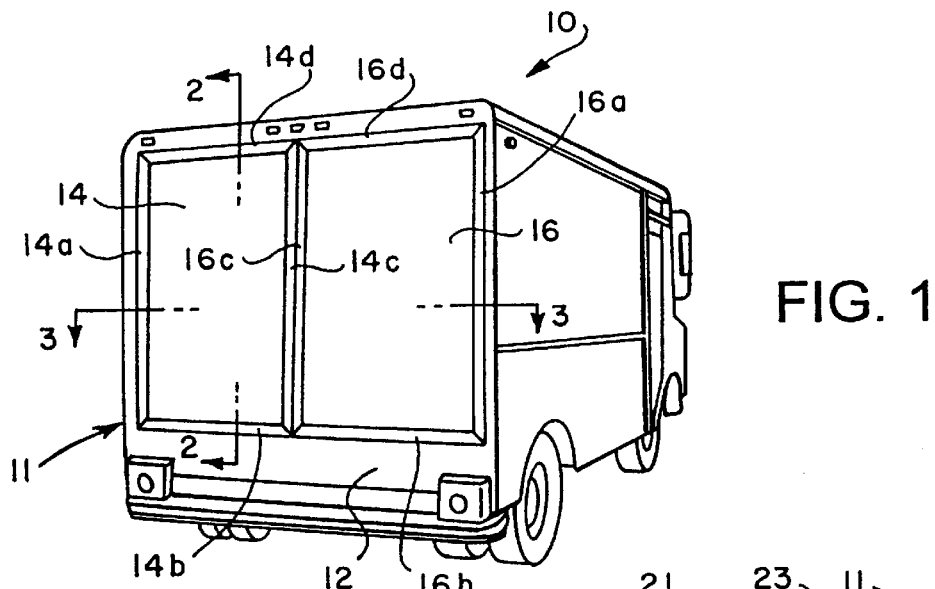
FIG. 1 is a perspective view of a motor truck having a cargo compartment with swing doors including door edge seal and retainer assemblies in accordance with the present invention.

In the description which follows, like parts are marked throughout the specification and drawing with the same reference numerals, respectively. The drawing figures are not necessarily to scale and certain features of the invention may be shown exaggerated in scale in the interest of clarity and conciseness.

Referring to FIG. 1, there is illustrated an over-the-road motor truck 10 including an integral cargo body or container 11 wherein a transverse rear wall 12 of the container is provided with opposed swing door panels 14 and 16. Door panels 14 and 16 are suitably hinged at their outboard vertical side edges 14a and 16a, respectively, to the cargo container 11 in a conventional manner. In cargo containers of all types and including, in particular, over-the-road motor vehicles, rail cars or containers designed for multi-modal service, it is important to provide long lasting weathertight seals between the cargo access doors and the door frame for a wide range of environmental conditions including a wide range of temperatures, ambient atmospheric pressures and moisture conditions. At the same time it is desirable to provide door panel edge seals which do not interfere with operation of the doors, particularly the closing action. Still further, for applications such as those illustrated and described herein, it is desirable to provide door panel edge seals which are economical to fabricate and may be easily replaced if desired.

The generally rectangular door panels 14 and 16 may be fabricated of various materials and constructions and are delimited by outer vertical side edges 14a and 16a. In addition, panel 14 is delimited by a bottom side edge 14b an inboard side edge 14c and a top side edge 14d. In like manner, the panel 16 is delimited by a bottom side edge 16b, an inboard side edge 16c and a top side edge 16d.

Figure 2:
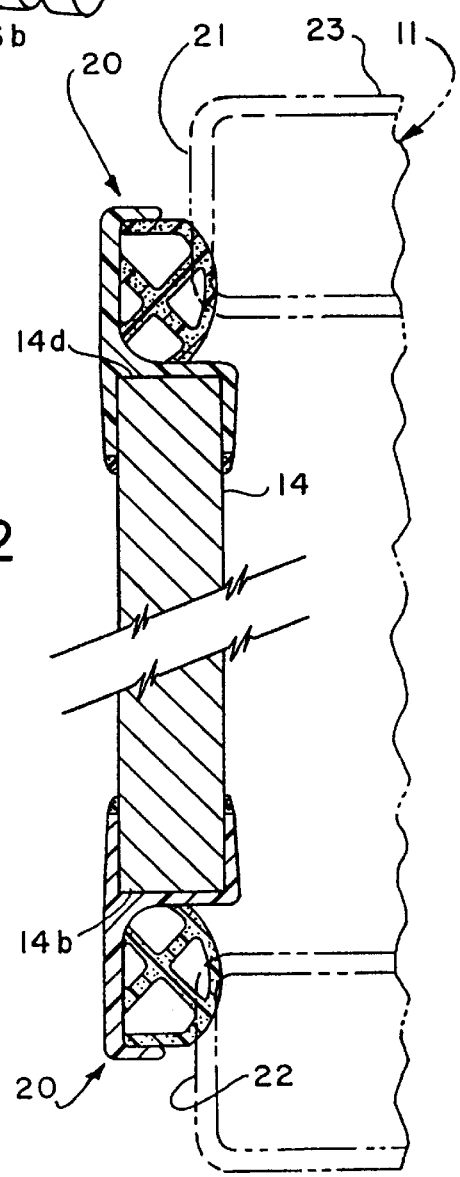
FIG. 2 is a section view taken along the line 2—2 of FIG. 1 showing one preferred embodiment of the invention.

Referring to FIGS. 2 and 3, it will be noted that the panel 14 is provided with a section or predetermined length of one preferred embodiment of a continuous panel seal and retainer assembly, generally designated by the numeral 20, extending along the side edge 14a, FIG. 3, and engageable with a rearwardly facing surface 25 of a frame 23 forming part of the rear wall 12 for the container 11. In like manner, a section of seal and retainer assembly 20 is also disposed on panel 14 along the bottom side edge 14b, FIG. 2, and engageable with a surface 22 of the container frame 23. Referring further to FIG. 2, a section of seal and retainer assembly 20 is supported on side edge 14d of the door panel 14 and engageable with a surface 21 of frame 23.

As shown in FIG. 3, a section of seal and retainer assembly 20 is also supported on and extends along the side edges 16a and 16c of the panel 16. Seal and retainer assemblies 20 extending along panel side edges 14a and 16a engage surfaces 25 and 27 of frame 23, as shown in FIG. 3. Panel side edges 16b and 16d are also provided with sections of seal and retainer assembly 20 forcibly engageable with frame 23 of rear wall 12 in the closed position of panel 16. It will be noted in FIG. 3 that, for a double swing door arrangement as described herein by way of example, the panel 14 is provided with a seal retainer member 30 only and extending along the side edge 14c. Retainer member 30 is engageable with a section of a seal and retainer assembly 20 to form a seal between the panel side edges 14c and 16c. The sections of door seal and retainer assembly 20, which extend along the panel edges 14a, 14b and 14d, and along the panel edges 16a, 16b, 16c and 16d, intersect each other at suitable mitered joints in accordance with conventional door and seal construction.

Accordingly, a substantially weathertight seal is provided between the frame 23 and the door panels 14 and 16. In the illustrations of FIGS. 2 and 3, the actual deflections of the seal member portions of the sections of seal and retainer assembly 20 are not illustrated and the interference between the undeflected portions of the seal member portion of the assembly 20 is illustrated to indicate how much deflection occurs between the frame 23 and the sections of seal and retainer assembly, as well as the amount of deflection which occurs between a retainer member 30 on panel side edge 14c and an adjacent section of seal and retainer assembly 20 mounted on panel edge 16c.

Referring now to FIG. 4, details of the seal and retainer assembly 20 are shown and will be described. Each section of seal and retainer assembly 20 includes an elongated section of retainer member 30, which is characterized by a channel-shaped portion 32 having a generally planar web 34 and opposed substantially coextensive flanges 36 and 38. The flanges 36 and 38 are spaced apart in an unrestrained position converging slightly toward each other, as fabricated. The distal ends of the flanges 36 and 38 comprise integrally formed resilient and tapered tip portions 37 and 39, which are coextensive. The cross-sectional thickness of the flanges 36 and 38 may be approximately the same as the web portion 34 or slightly less and the flanges are resiliently deflectable to engage the opposite faces of the panels 14 and 16 when supported on the respective edges of the panels, as illustrated in FIGS. 2 and 3. The resilient tips 37 and 39 curve slightly inwardly toward each other so that they tightly engage opposed inner and outer parallel surfaces of the panels 14 and 16 to form a substantially weathertight seal between the panel edges and the channel portion 32.

The retainer member 30 also includes a seal support base part 42 extending substantially normal to the web 34 and being of a cross-sectional thickness about 60% greater than the thickness of the web 34. The seal support part 42 supports a distal flange part 44 extending normal to the support part and spaced from and generally parallel to the web 34 to form a seal receiving channel. The junction of the seal support part 42 and the web 34 is generously reinforced by a large radius fillet 45, as shown in FIG. 4.

The seal and retainer assembly 20 includes a resilient seal member 50 supported by the base part 42 and the web 34 and extending between the web 34 and the distal flange 44. The seal member 50 includes a convex and substantially arcuate seal rim part 52, extending between the web 34 and a generally planar rim part 54. Rim part 54 extends parallel to and is contiguous with the flange 44. Flange 44 provides support for the seal member 50 to prevent unwanted deflection thereof away from a surface engageable with the seal member, such as frame 23. The seal member 50 also includes intersecting reinforcing webs 56 and 58, which intersect at substantially right angles to each other at a coextensive integral hub 57. The web 56 extends between the convex rim part 52 and the base part 42 and the web 58 also extends between the convex rim part 52 and the base part 42 forming four separate voids or so-called "honeycomb" spaces 59a, 59b, 59c and 59d. The intersecting webs 56 and 58 provide added strength for the seal rim part 52 and are operable to restore the rim part 52 to its undeflected position shown in FIG. 4 while providing substantial support for the rim part when it is deflected so as to assist in holding the rim part in tight engagement with a surface of the frame 23. By providing the webs 56 and 58 to intersect the seal rim part 52 and be contiguous therewith at spaced-apart points 56a and 58a, and to intersect each other at the hub 57 an enhanced long-life seal member 50 is provided which maintains resiliency over a long service life and maintains its elastic memory to be restored to its undeflected position, as shown in FIG. 4, while also allowing deflection of the seal rim part 52.

The seal and retainer assembly 20 is advantageously fabricated by coextrusion of the retainer member 30 and the seal member 50 of a suitable polymer. Since the seal member 50 requires to be elastically resilient, the hardness, rigidity or stiffness of the seal member is substantially less than the retainer member 30. By way of example, one preferred configuration of the combination seal and retainer assembly 20 is coextruded of polyvinyl chloride wherein the retainer member 30 preferably has a hardness of 78 durometer D Heavy Duty. The resilient tips 37 and 39 preferably have a hardness of 65 durometer A Heavy Duty and the seal member 50 preferably has a hardness of about 65 durometer A Heavy Duty, including the convex rim part 52, the rim part 54, the webs 56 and 58 and the hub portion 57. These hardness values may vary somewhat but a measurable difference between the hardnesses of the seal member and the retainer member is important. Thanks to the coextrusion of the retainer member 30 and the seal member 50, there is no requirement to separately bond these parts together nor is there any chance of the seal member becoming detached from the retainer member as a result of adhesive failure.

The sections of the seal and retainer assembly 20 are e suitably secured to the panels 14 and 16 by conventional mechanical fastening, or, preferably, by adhesive bonding using a suitable adhesive between the panel edges and the inside surfaces of the flanges and web of the channel portion 32. A retainer member 30, without the seal member 50, may be used as a seal engaging member secured to panel edge 14c, as indicated in FIG. 3.

Figure 5:
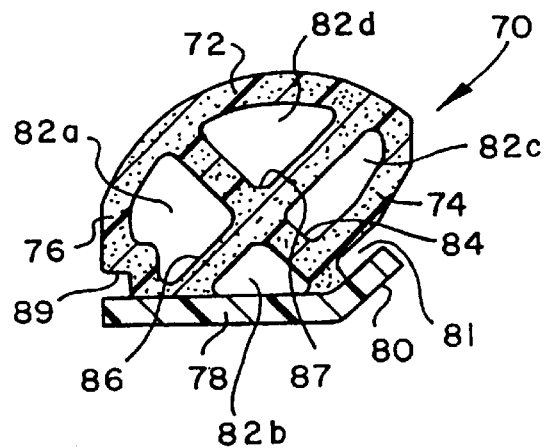
FIG. 5 is a transverse section view of a seal member for another alternate embodiment of a seal and retainer assembly in accordance with the invention.
Figure 6:
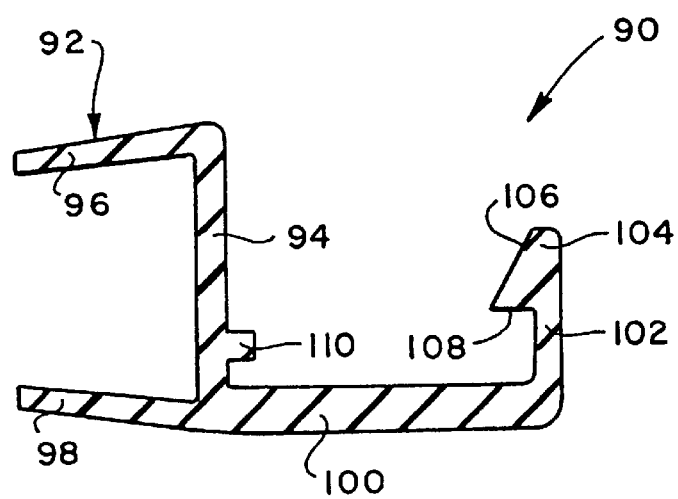
FIG. 6 is a transverse section view of a retainer member for use with the seal member of FIG. 5.
Figure 7:
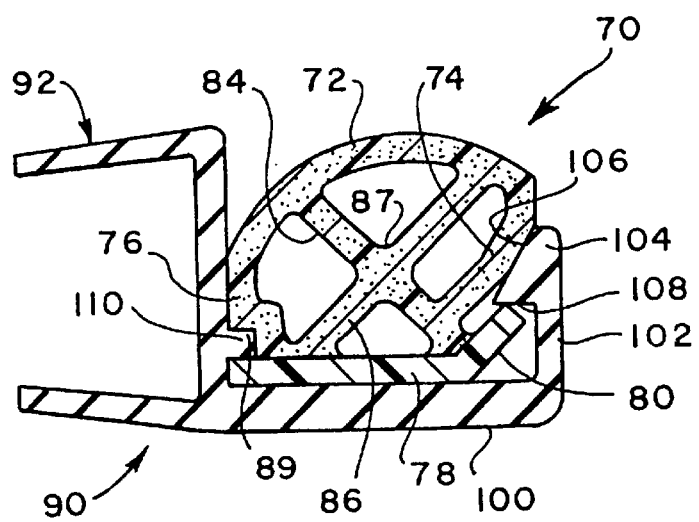
FIG. 7 is a transverse section view showing the seal and retainer members of FIGS. 5 and 6 assembled.

Referring now to FIG. 4a, an alternate embodiment of a swing door edge seal and retainer assembly is illustrated and generally designated by the numeral 20a. The seal and retainer assembly 20a is similar in many respects to the seal and retainer assembly 20 and may utilize an extruded retainer member 30 having a channel-shaped portion with a web 34 and opposed flanges 36 and 38. Base part 42 and flange 44 are integrally formed by coextrusion with a flexible resilient seal member 50a having a convex arcuate seal rim part 52a and a single flexible web 56c extending substantially normal to the base part 42 and approximately equidistant between the web 34 and flange 44. The hardness of the rim part 52a and the web 56c may be the same as for the seal member 50. However, the rim part 52a terminates at one end at the web 34 and at the opposite end at the distal end of the flange 44. Opposed interior spaces or voids 59e and 59f are formed by the base part 42, the rim part 52a, the web 56c, the web 34 and the flange 44. Referring now to FIGS. 5 through 7, there is illustrated another embodiment of a swing door edge seal and retainer assembly in accordance with the invention, including a resilient seal member 70, see FIG. 5, which is similar in some respects to the seal member 50 and is provided with a convex arcuate rim part 72, which is integrally joined to a somewhat radially extending rim portion 74, extending substantially radially with respect to the curvature of the rim part 72.

An opposed, generally planar rim portion 76 forms a continuation of the rim part 72 to a point of integral joining with a generally planar elongated base part 78. The base part 78 includes an inclined portion 80 at one lateral side adjacent to the radial rim portion 74. Rim portion 74 also stands off slightly from base portion 80 to define a slot 81. The seal member 70 also includes internal honeycomb spaces 82a, 82b, 82c and 82d which are defined by the rim part 72, the rim portions 74 and 76, the base part 78 and opposed integral webs 84 and 86, which intersect each other at a hub 87. The webs 84 and 86 are integrally joined at one edge to the convex rim part 72 and are also integrally joined at their opposite edges to the base part 78, 80. The juncture of the rim portion 76, the web 86 and the base part 78 is also defined partly by a longitudinally extending notch or channel 89, FIG. 5.

The resilient seal member 70 may be formed of the same material as the seal member 50 and the base part 78, 80 may have a substantially greater hardness or stiffness than the part of the seal member defined by the rim part 72, the rim portions 74 and 76 and the webs 84 and 86. The juncture of these portions of the seal member with the base member 78, 80 forms a line of demarcation between the hardness or stiffness of the resilient part of the seal member and the somewhat rigid support formed by the base part 78, 80. For example, the hardness or durometer readings of the seal rim parts 72, 74 and 76 and webs 84 and 86 may be the same as the seal member 50 and the durometer readings of the base part 78, 80 the same as the retainer member 30.

Referring now to FIG. 6, the embodiment of the seal and retainer assembly illustrated in FIGS. 5 through 7 includes a retainer member 90 which may be formed of an extruded metal, such as aluminum, for example, and is characterized by a channel-shaped part 92 for attachment to the side edges of a door panel, such as the panels 14 and 16, for example, in place of the seal and retainer assemblies 20. The channel part 92 includes a planar transverse web 94 and opposed substantially coextensive flanges 96 and 98. The channel part 92 is joined to a base part 100 extending substantially normal to the web 94 and terminating at an upturned flange 102 extending somewhat parallel to the web 94. The flange 102 includes a seal retainer hook portion 104 defined by a sloping wall 106 and a reentrant edge 108 extending substantially parallel to the base part 100. Opposite the hook portion 104 is an elongated integral tang 110 extending normal to the web 94 and operable to be disposed in the channel or notch 89 of the seal member 70 when the seal member 70 is assembled to the retainer member 90, as shown in FIG. 7.

Referring further to FIG. 7, there is illustrated the assembly of the seal member 70 to the retainer member 90 wherein, as mentioned above, the seal member is retained in assembly with the retainer member by engagement of the tang 110 extending within the channel 89 and the upturned portion 80 of the base part 78 engaged with the reentrant edge 108 of the hook portion 104 to retain the seal member securely attached to the retainer member. The sloping wall 106 serves two purposes, one being a wedging surface to allow deflection of the base part 78, 80, as it is inserted into its working position on the retainer member 90 and then to support the rim portion 74, as shown in FIG. 7, when the seal rim part 72 is deflected upon engagement with the frame 23, for example, or with a retainer member attached to the panel edge 14c, for example, in place of a retainer member 30, as shown in FIG. 3.

Although the base part 78, 80 is of greater stiffness than the remainder of the seal member 70, it will still undergo some elastic deflection upon insertion of the seal member 70 into engagement with the retainer member 90 to allow assembly to occur and to provide for springback of the upturned base portion 80 to engage the hook portion 104 of the retainer member. Alternatively, the seal member 70 may be assembled to the retainer member 90 by sliding the retainer part 78, 80 into engagement with the retainer member 90 from one end thereof.

The embodiment of the invention shown in FIGS. 5 through 7 possesses certain advantages in that the seal member 70 may be replaced without replacing the retainer member 90. The snap together assembly of the seal member 70 to the retainer member 90 may be done with ease and allows the seal member to be fabricated of a material substantially different from the retainer member. Moreover, the seal member 70 may be replaced, if damaged, without removing the retainer member 90 from the door panel. In this regard, a damaged or worn seal member 70 may be pried out of the channel formed by the retainer member 90 between the web 94 and the flange 102 or slidably removed from one end of the channel and a new seal member assembled to the retainer member. In other respects, the seal and retainer assembly illustrated in FIGS. 5 through 7 enjoys the advantages of the seal and retainer assembly 20.

The construction and use of the seal and retainer assemblies described hereinabove, is believed to be understandable to those of skill in the art from the foregoing description. Those skilled in the art will further recognize that various substitutions and modifications may be made to the seal and retainer assemblies shown and described without departing from the scope and spirit of the appended claims.

What is claimed is:

1. A seal and retainer assembly for sealing a panel edge of a swing door panel for a cargo container, said assembly comprising:

an elongated retainer member including a channel part for receiving said panel edge of said panel and for supporting said assembly on said panel and a retainer base part, said channel part including a web and opposed flanges forming a channel for receiving said panel edge, said retainer base part extending generally normal to said web and opposite said flanges, said retainer base part including a flange which extends generally normal to said retainer base part at a distal end thereof to thereby form a seal receiving channel between said web and said flange of said retainer base part; and an elongated seal member formed of a resilient polymer material and supported by said retainer base part, said seal member including a first rim part and a second rim part, said first rim part being generally convex in shape and having opposite ends with one of said ends being in engagement with said web and another of said ends being connected to said second rim part, said first rim part being operable to engage a frame of said cargo container to form a seal between said panel edge and said frame, said second rim part extending from said first rim part and engaging said flange of said retainer base part, said seal member further comprising at least a first interior web contiguous with said first rim part and extending toward said retainer base part and defining a plurality of interior spaces formed between said first rim part and said retainer base part to allow resilient deflection of said seal member upon engagement with said frame and to restore said seal member to an undeflected position upon disengagement from said frame.

2. The seal and retainer assembly set forth in claim 1 wherein:

said seal member includes a second interior web contiguous with said first rim part, said first and second interior webs extending toward said base part and intersecting each other at an integral hub.

3. The seal and retainer assembly set forth in claim 1, wherein:

said flange of said retainer base part includes a reentrant edge for engagement with said seal member for retaining said seal member in engagement with said retainer member.

4. The seal and retainer assembly set forth in claim 3 wherein:

said seal member includes a generally planar base part including a portion engageable with said reentrant edge for retaining said seal member in engagement with said retainer member.

5. The seal and retainer assembly set forth in claim 4 wherein:

said web includes an elongated tang formed thereon opposite said reentrant edge and said seal member includes a channel for receiving said tang for retaining said seal member in engagement with said retainer member.

6. The seal and retainer assembly set forth in claim 4 wherein:

said first and second rim parts and said first interior web of said seal member are coextruded with said base part of said seal member.

7. The seal and retainer assembly set forth in claim 6 wherein:

said first and second rim parts and said first interior web of said seal member have a hardness of not more than approximately 65 durometer A Heavy Duty and said base part of said seal member has a hardness of not less than approximately 78 durometer D Heavy Duty.

8. The seal and retainer assembly set forth in claim 7 wherein:

said seal member is extruded of polyvinyl chloride.

9. The seal and retainer assembly set forth in claim 6 wherein:

said retainer member is formed of an extruded metal.

10. The seal and retainer assembly set forth in claim 1 wherein:

said second rim part is generally planar.

11. The seal and retainer assembly set forth in claim 1 wherein:

said seal member and said retainer member are coextruded from said polymer material.

12. The seal and retainer assembly set forth in claim 11 wherein:

said seal member has a hardness of not more than approximately 65 durometer A Heavy Duty and said retainer member has a hardness of not less than approximately 78 durometer D Heavy Duty.

13. The seal and retainer assembly set forth in claim 1 wherein:

said seal member and said retainer member are integrally joined and are coextruded of a polyvinyl chloride.

14. The seal and retainer assembly set forth in claim 1 wherein:

said retainer member comprises an extruded part wherein said web and said flanges of said channel part are integral with said retainer base part.

15. The seal and retainer assembly set forth in claim 14 wherein:

each of said flanges of said channel part includes a tip portion and a remaining portion extending between said tip portion and said web, said tip portion of each of said flanges of said channel part having a hardness less than said remaining portion of each of said flanges of said channel part for sealing engagement with opposed sides of said panel edge when said retainer member is assembled to said panel.

16. A seal and retainer assembly for sealing a panel edge of a swing door panel for a cargo container, said seal and retainer assembly comprising:

an elongated retainer member including a channel part for receiving said panel edge and for supporting said seal and retainer assembly on said panel and a retainer base part, said channel part including a web and opposed flanges forming a channel for receiving said panel edge and said retainer base part extending generally normal to said web and opposite said flanges; and an elongated seal member supported by said retainer base part, said seal member including a convex rim part operable to engage a frame of said cargo container to form a seal between said panel edge and said frame and at least one interior web having opposite ends, one of said ends being monolithically formed with said rim part and another of said ends being monolithically formed with said retainer base part to allow resilient deflection of said seal member upon engagement with said frame and to restore said seal member to an undeflected position upon disengagement from said frame, said seal member and said retainer member being coextruded from a polymer material and said seal member and said retainer member having different hardnesses, wherein said retainer member is a substantially rigid member for supporting said seal member, and further wherein said seal member is substantially resilient.

17. The seal and retainer assembly set forth in claim 16 wherein:

the hardness of said seal member is not more than approximately 65 durometer A Heavy Duty and the hardness of said retainer member is not less than approximately 78 durometer D Heavy Duty.

18. A seal and retainer assembly for sealing a panel edge of a swing door panel for a cargo container, said assembly comprising:

an elongated retainer member including a channel part for receiving said panel edge of said panel and for supporting said assembly on said panel and a retainer base part, said channel part including a web and opposed flanges forming a channel for receiving said panel edge and said retainer base part extending generally normal to said web and opposite said flanges, said retainer base part including a flange which extends generally normal to said retainer base part at a distal end thereof to thereby form a seal receiving channel between said web and said flange of said retainer base part;

an elongated seal member formed of a resilient material and supported by said retainer base part, said seal member including a generally convex rim part having opposite ends with one of said ends being in engagement with said web and another of said ends being in engagement with said flange of said retainer base part, said rim part being operable to engage a frame of said cargo container to thereby sealingly connect said panel edge and said frame, said seal member further comprising at least a first interior web having opposite ends, one of said ends of said interior web being contiguous with said rim part and another of said ends of said interior web being connected to said retainer base part such that a plurality of interior spaces are formed between said rim part and said retainer base part to allow resilient deflection of said seal member upon engagement with said frame and to restore said seal member to an undeflected position upon disengagement from said frame.

19. The seal and retainer assembly set forth in claim 18 wherein:

said seal member includes a second interior web having opposite ends, one of said ends of said second interior web being contiguous with said rim part and another of said ends of said second interior web being connected to said retainer base part, said first and second interior webs intersecting each other at an integral hub.

* * * * *